US011931306B2

(12) United States Patent
Wang

(10) Patent No.: US 11,931,306 B2
(45) Date of Patent: Mar. 19, 2024

(54) INVERSION TABLE WITH AN ANKLE LOCKING SYSTEM

(71) Applicant: BETO ENGINEERING AND MARKETING CO., LTD., Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 295 days.

(21) Appl. No.: 17/475,910

(22) Filed: Sep. 15, 2021

(65) Prior Publication Data

US 2023/0008600 A1 Jan. 12, 2023

(30) Foreign Application Priority Data

Jul. 6, 2021 (TW) ................................ 110124819

(51) Int. Cl.

*A61H 1/02* (2006.01)
*A63B 23/00* (2006.01)
*A63B 23/02* (2006.01)

(52) U.S. Cl.

CPC ......... *A61H 1/0229* (2013.01); *A61H 1/0292* (2013.01); *A63B 23/0238* (2013.01); *A61H 2201/1642* (2013.01); *A61H 2203/0493* (2013.01); *A63B 2023/006* (2013.01)

(58) Field of Classification Search

CPC ................ A61H 1/0229; A61H 1/0292; A61H 2201/1642; A61H 2203/0493; A61H 1/0218; A63B 23/0238; A63B 23/0211; A63B 2208/0285; A63B 69/0062; A63B 23/0233; A63B 21/068

USPC .......................................................... 482/144

See application file for complete search history.

(56) References Cited

U.S. PATENT DOCUMENTS 4,534,555 A * 8/1985 McGowen ........... A61H 1/0218 482/144
2013/0079204 A1* 3/2013 Wang .................. A61H 1/0222 482/144

* cited by examiner

*Primary Examiner* — Sundhara M Ganesan
*Assistant Examiner* — Jacqueline N L Loberiza
(74) *Attorney, Agent, or Firm* — Muncy, Geissler, Olds & Lowe, P.C.

(57) ABSTRACT

An inversion table includes a supporting stand having a first interlocking member, and a tilt inversion mechanism. The tilt inversion mechanism includes an inversion unit pivoted on the supporting stand, a feet holding unit, and a locking unit having a second interlocking member disposed on the inversion unit. The tilt inversion mechanism is operable relative to the supporting stand such that the feet holding unit is disengaged from the locking unit in a non-reversible state, and that the feet holding unit is engaged with the locking unit in a reversible state.

7 Claims, 9 Drawing Sheets

INVERSION TABLE WITH AN ANKLE LOCKING SYSTEM

CROSS-REFERENCE TO RELATED APPLICATION

This application claims priority of Taiwanese Patent Application No. 110124819, filed on Jul. 6, 2021.

FIELD

The disclosure relates to an inversion table, and more particularly to an inversion table including an ankle locking system for safety purposes.

BACKGROUND

An inversion table is an excellent way for a user to do an inverted activity, which promotes blood circulation to strengthen oxygenated blood, increases brain oxygen, relieves muscle soreness, and relieves the pressure on the spine. However, it is very important to safely use an inversion table.

SUMMARY

Therefore, an object of the disclosure is to provide an inversion table that can alleviate at least one of the drawbacks of the prior art.

According to the disclosure, the inversion table includes a supporting stand and a tilt inversion mechanism. The supporting stand has a first interlocking member disposed on a lower portion thereof. The tilt inversion mechanism includes an inversion unit, a feet holding unit and a locking unit. The inversion unit is pivotally or reversely supported on the supporting stand. The feet holding unit is disposed on a lower portion of the inversion unit. The locking unit has a second interlocking member which is disposed on the lower portion of the inversion unit and removably engaged with the first interlocking member. The tilt inversion mechanism is operable relative to the supporting stand between a non-reversible state and a reversible state. The feet holding unit is disengaged from the locking unit in the non-reversible state. The feet holding unit is engaged with the locking unit in the reversible state.

With the removable engagement of the locking unit with the supporting stand, and the operable meshing of the feet holding unit with the locking unit, the tilt inversion mechanism cannot be rotated in the non-reversible state, and is allowed to be rotated in the rotatable state so as to prevent undesired rotation of the tilt inversion mechanism once the user is not held well on the tilt inversion mechanism and effectively improve safety of using the inversion exerciser.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
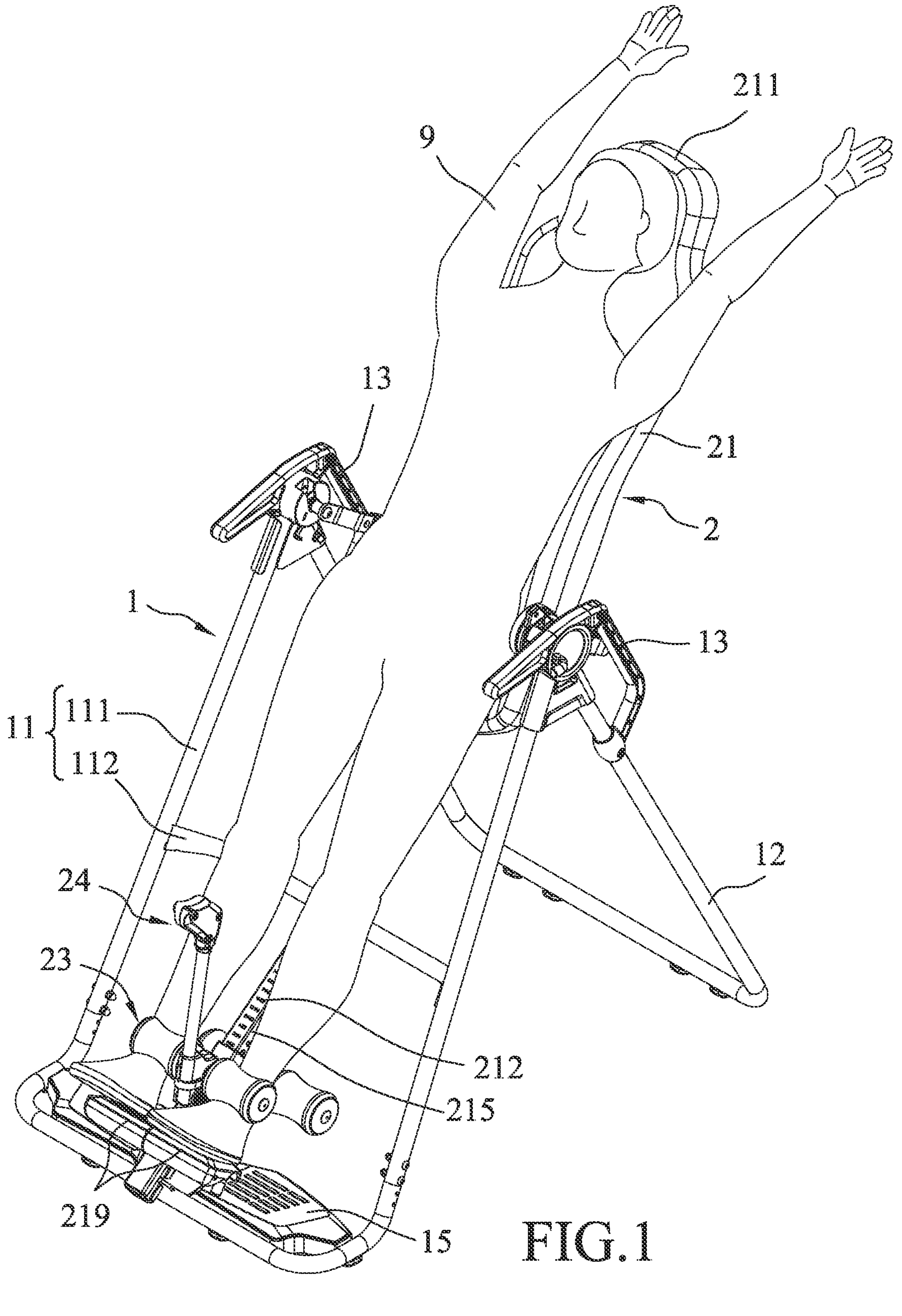
FIG. 1 is a perspective view illustrating an embodiment of an inversion table according to the disclosure.
Figure 2:
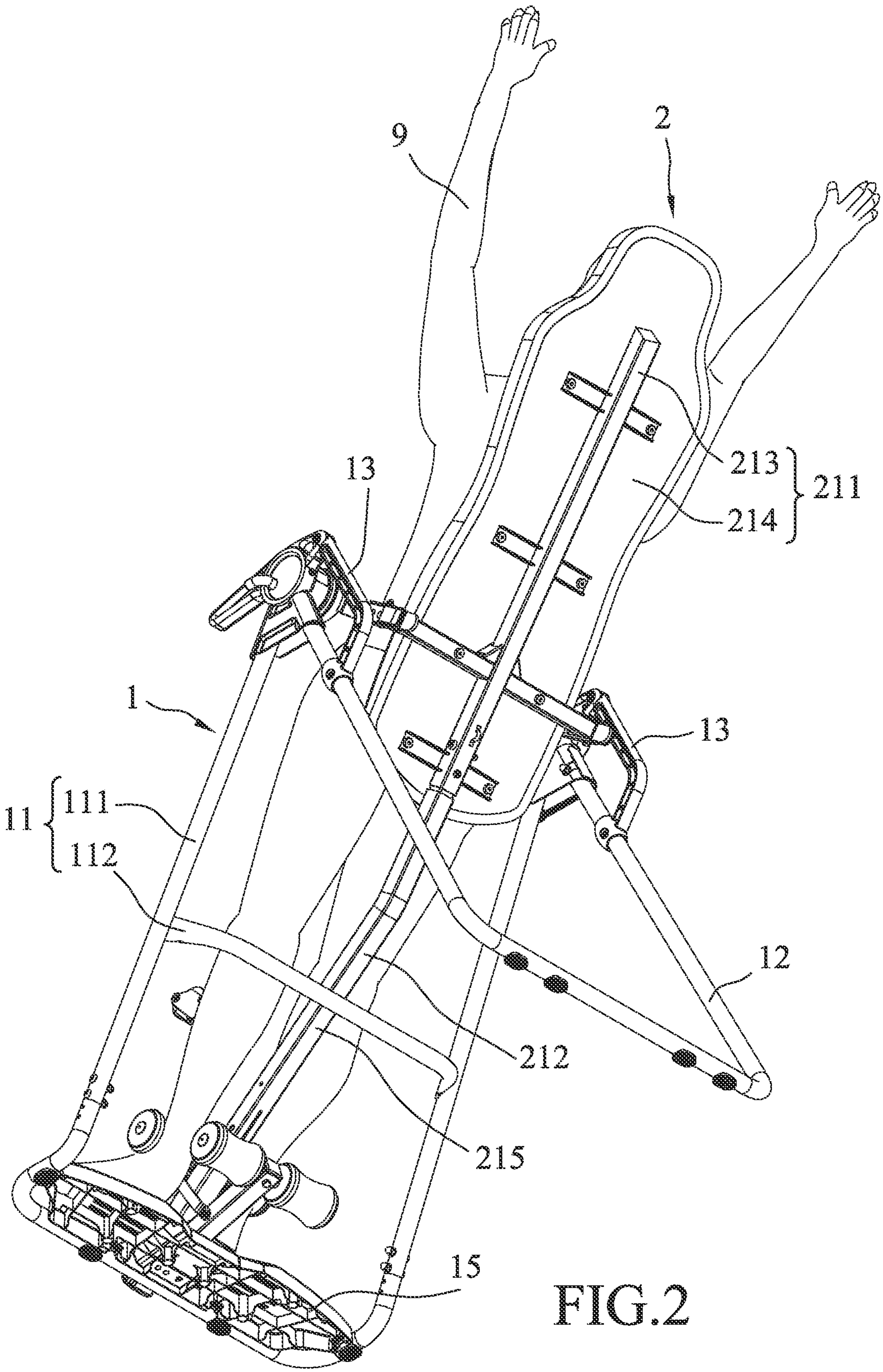
FIG. 2 is a perspective view of the embodiment, taken from another angle.
Figure 3:
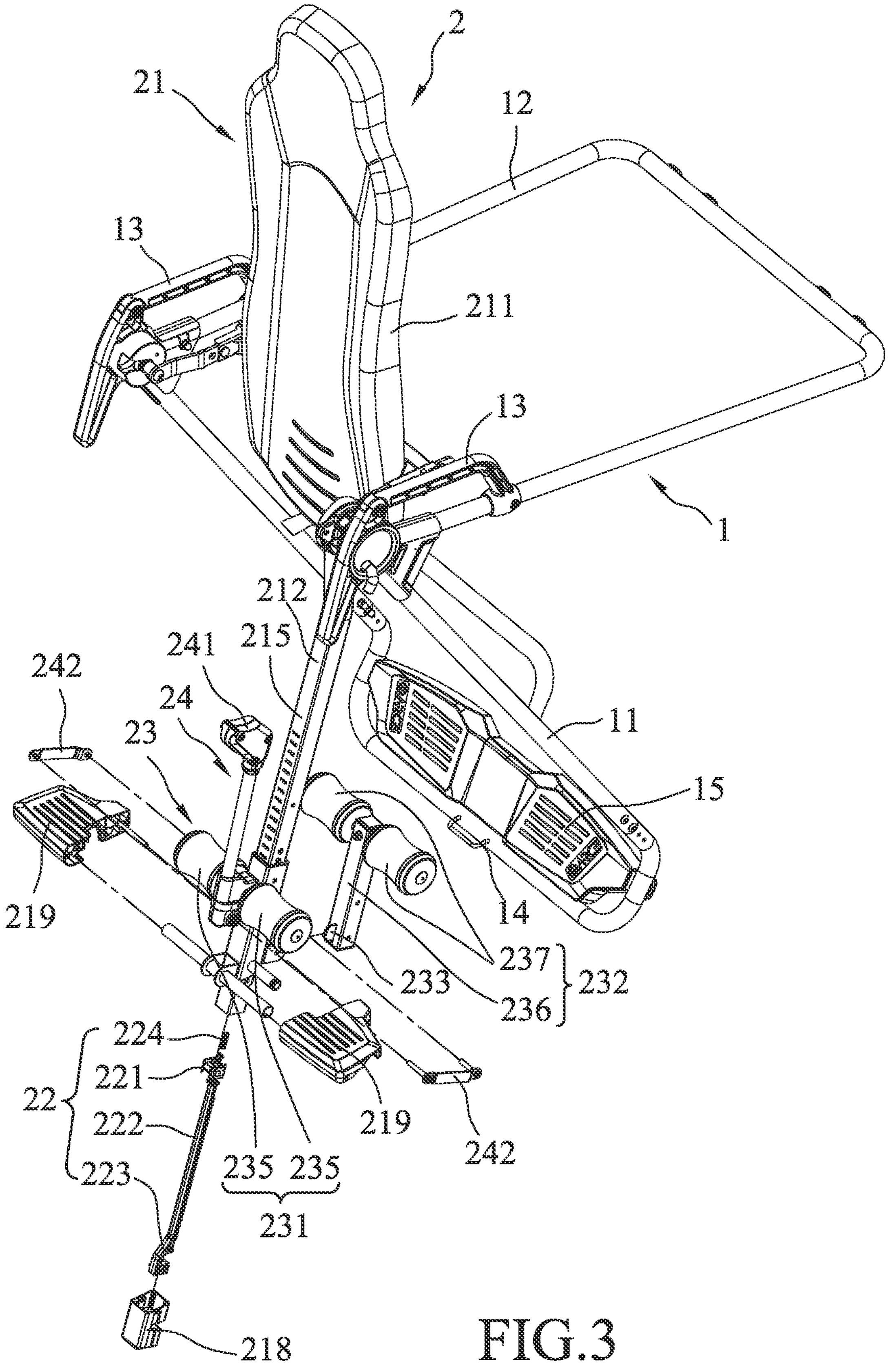
FIG. 3 is a partly-exploded perspective view of the embodiment.
Figure 4:
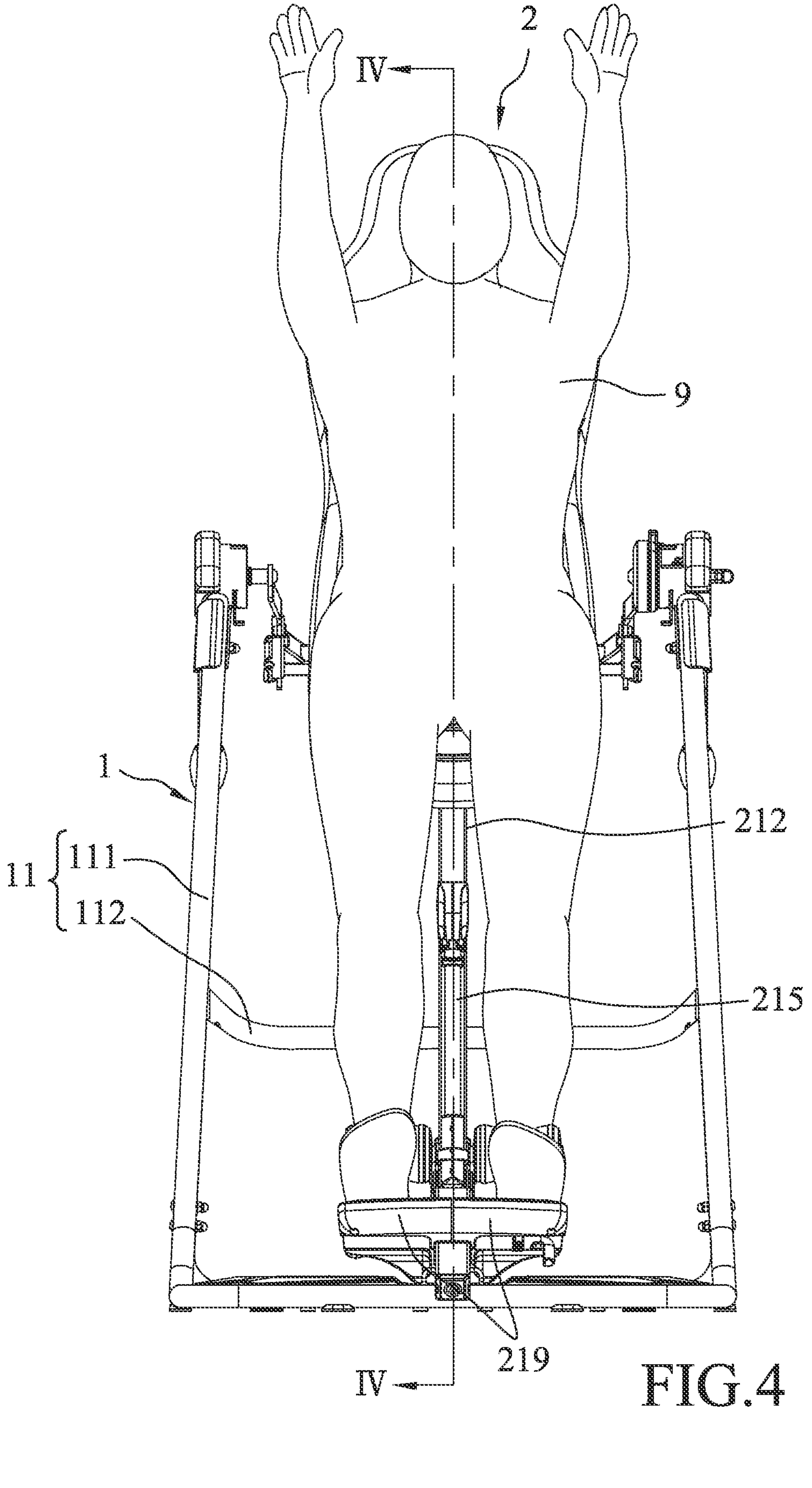
FIG. 4 is a schematic front view of the embodiment.

Referring to FIGS. 1 to 3, an embodiment of an inversion table is used by a user 9 to do an inverted activity, and includes a supporting stand 1 and a tilt inversion mechanism 2.

The supporting stand 1 includes a front supporting stand portion 11, a rear supporting stand portion 12, two hand grips 13, a first interlocking member 14 and a foot plate 15. The front supporting stand portion 11 has a U-shaped front frame 111 and a crosspiece 112 interconnecting left and right sides of the front frame 111. The rear supporting stand portion 12 is U-shaped and has an upper end securely connected with an upper end of the front supporting stand portion 11 to form an inverted V-shaped structure. The hand grips 13 are respectively disposed on left and right sides of the rear supporting stand portion 12, and extend and bend upwardly and forwardly. The foot plate 15 is disposed at a front side of the front supporting stand portion 11 and rearwardly of the first interlocking member 14.

The tilt inversion mechanism 2 includes an inversion unit 21, a feet holding unit 23, a locking unit 22 and an operating unit 24.

The inversion unit 21 includes a support table assembly 211 and an extension assembly 212. The support table assembly 211 has a table frame 213 pivotally or reversely mounted on a top side of the supporting stand 1 and extending in a lengthwise direction, and a backrest plate 214 supported on a front side of the table frame 213 for resting a back of the user 9 thereon.

With reference to FIGS. 3 to 6, the extension assembly 212 is coupled with and extends from the support table assembly 211 downwardly and in the lengthwise direction. The extension assembly 212 includes an extension tube 215 and a foot retaining plate 219 for positioning the feet of the user 9 thereon. The extension tube 215 is securely disposed on a lower side of the table frame 213. The foot retaining plate 219 is disposed on the extension tube 215 below the feet holding unit 23. The extension tube 215 defines a mounting passage 216, a slot 217 and a through hole 218 therein. The mounting passage 216 extends downwardly and forwardly in the lengthwise direction. The slot 217 penetrates radially through the extension tube 215 to be in communication with the mounting passage 216 and extends in the lengthwise direction. The through hole 218 extends radially through the extension tube 215 to be in communication with the mounting passage 216 and is spaced apart from and downwardly of the slot 217 for permitting insertion of the first interlocking member 14 into the mounting passage 216 through the through hole 218.

The locking unit 22 is disposed in the mounting passage 216 and is removably engaged with the first interlocking member 14 of the supporting stand 1. The locking unit 22 includes a mounting seat 221, an elongated movable member 222, a second interlocking member 223 and a spring 224.

The mounting seat 221 is securely connected with an inner wall of the extension tube 215 and proximate to the support table assembly 211, and has a penetrating hole 225 extending therethrough in the lengthwise direction. The movable member 222 extends through the penetrating hole 225 and downwardly in the lengthwise direction to be mounted on and movable relative to the mounting seat 221 in the lengthwise direction. The movable member 222 has a toothed portion 226 extending in the lengthwise direction. The second interlocking member 223 is integrally formed with and extends downwardly from a lower end of the movable member 222, and is engaged with or disengaged from the first interlocking member 14 at the through hole 218 of the extension tube 215. The spring 224 abuts against a top side of the mounting seat 221 and the movable member 222 to bias the movable member 222 toward the support table assembly 211. The first interlocking member 14 is insertable into the mounting passage 216 through the through hole 218 to be engaged with the second interlocking member 223. In this embodiment, the second interlocking member 223 is in the form of a hook, and the first interlocking member 14 is a half-ring member interengageable with the second interlocking member 223.

The feet holding unit 23 is disposed on a lower portion of the inversion unit 21 for holding the feet of the user 9. The feet holding unit 23 includes a front feet holding assembly 231, a rear feet holding assembly 232, and a toothed plate 233 securely disposed on the rear feet holding assembly 232.

The front feet holding assembly 231 is securely disposed on the extension tube 215 of the extension assembly 212 and above the foot retaining plate 219 for the user's feet to abut thereagainst. The front feet holding assembly 231 includes two front ankle abutting members 235 disposed on a front side of the extension tube 215. The rear feet holding assembly 232 is for the user's ankles to abut thereagainst, and cooperates with the front feet holding assembly 231 to hold or position the user's feet. The rear feet holding assembly 232 is pivotably connected to a rear of a lower portion of the extension tube 215, and includes a rear shaft 236 which has a lower end pivotably connected to the foot retaining plate 219 of the extension assembly 212, and which extends rearwardly and upwardly from the lower end to have an upper end, and two rear ankle abutting members 237 which are connected with the upper end of the rear shaft 236. Thus, the upper end of the rear shaft 236 and the rear ankle abutting members 237 are pivotable relative to the extension assembly 212. The rear shaft 236 extends to intersect the toothed portion 226 by an included angle (θ1). The toothed plate 233 is securely disposed on the rear shaft 236 and adjacent to the lower end to be moved with the pivoting of the rear feet holding assembly 232 so as to permit the toothed plate 233 to extend into the mounting passage 216 of the extension tube 215 through the slot 217. The toothed plate 233 extends to intersect the rear shaft 236 by a predetermined angle (θ2), and has a toothed edge 238 which faces and is engageable with the toothed portion 236 of the movable member 222.

The operating unit 24 is operable to actuate the pivoting of the rear feet holding assembly 232, and includes an operating lever 241 and two transmitting members 242. The operating lever 241 is rotatably connected with a front side of the extension tube 215 through a pivot joint 243. Each transmitting member 242 is linked and connected between the operating lever 241 and an intermediate portion of the rear shaft 236 between the toothed plate 233 and the rear ankle abutting members 237 so as to transmit rotation of the operating lever 241 to pivot the rear feet holding assembly 232. It is noted that only one transmitting member 242 may be alternatively and pivotably connected with a left or right side of the rear shaft 236 and the operating lever 241.

Figure 5:
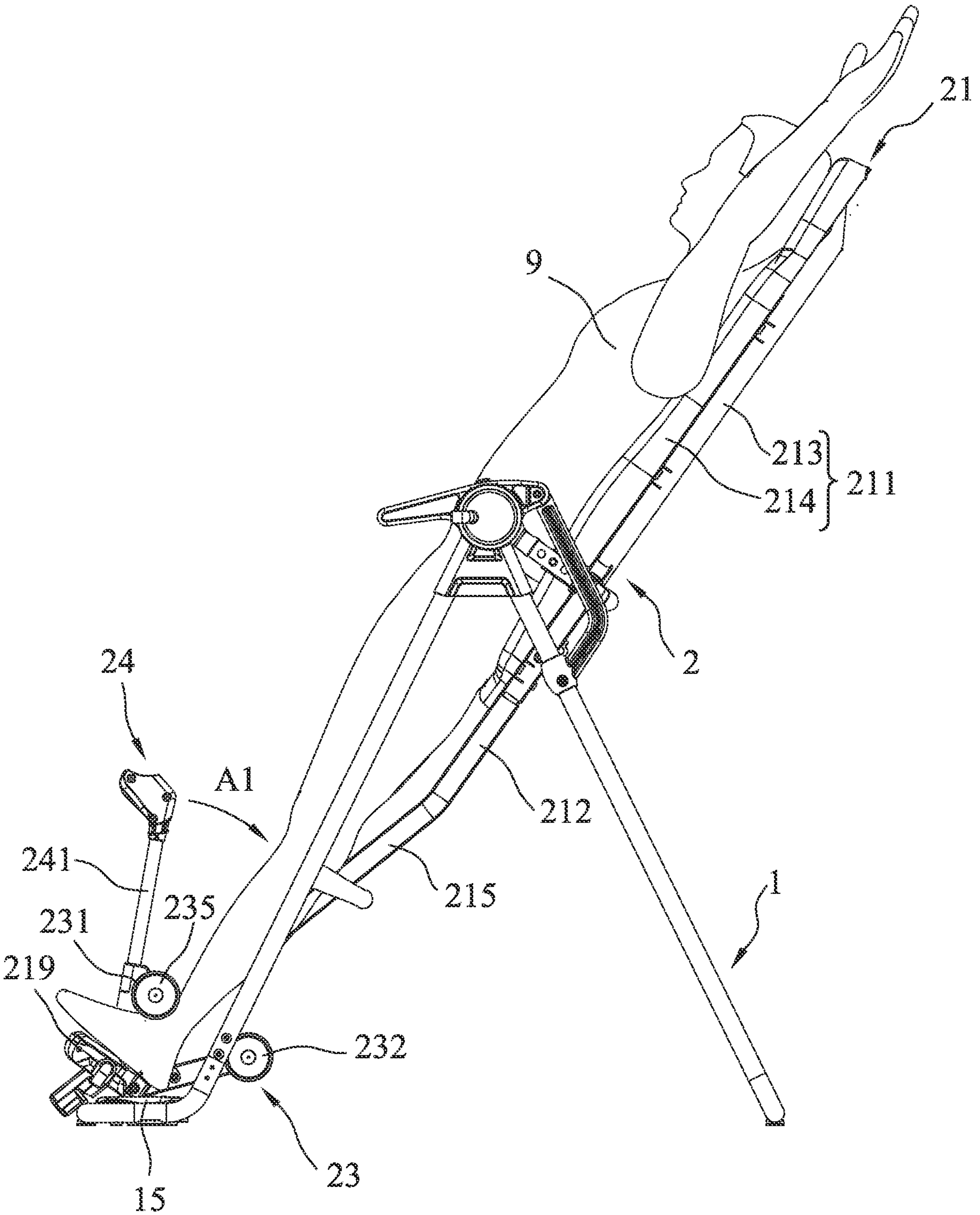
FIG. 5 is a schematic side view of the embodiment, illustrating when a tilt inversion mechanism is in a non-reversible state.
Figure 6:
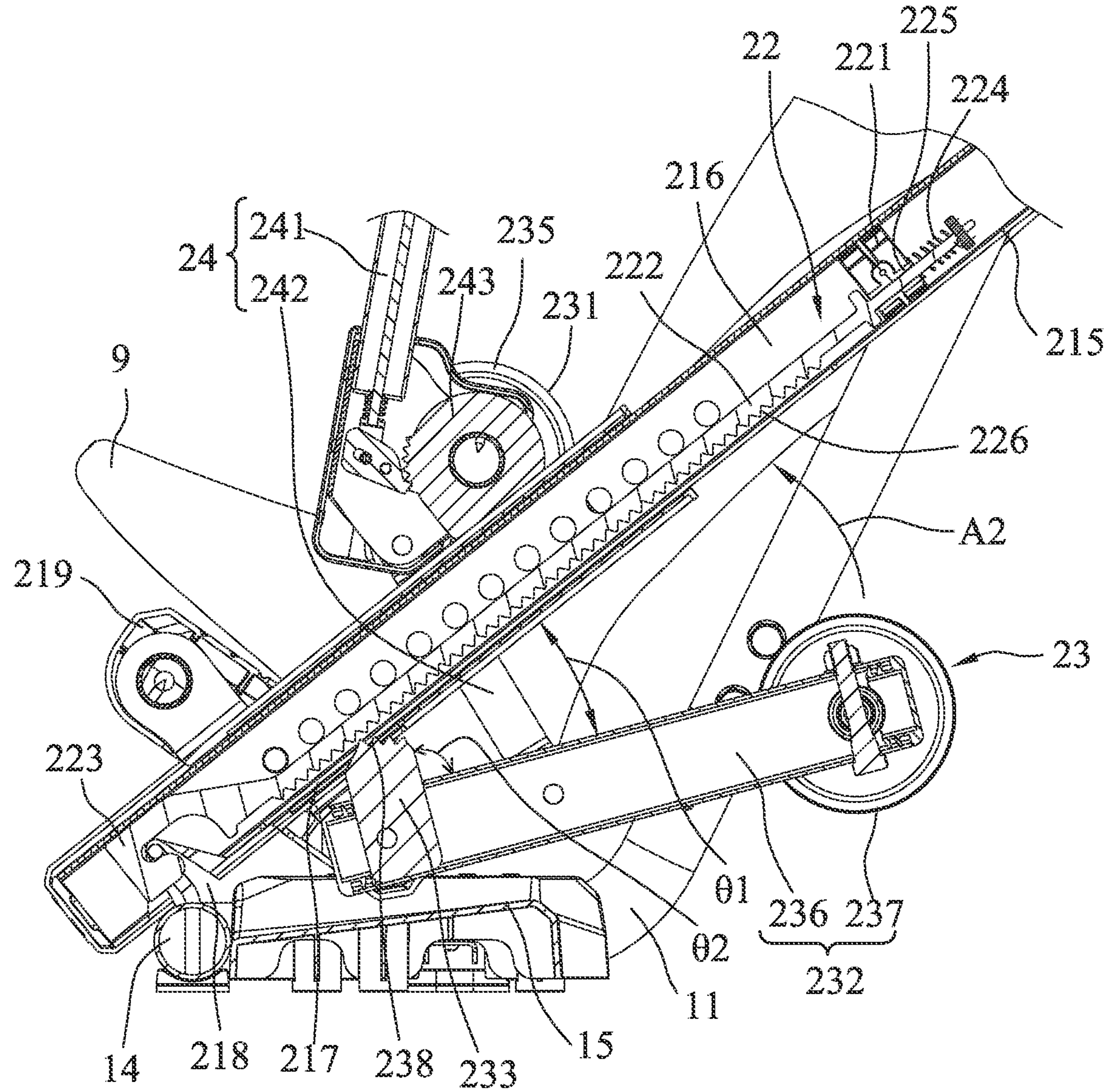
FIG. 6 is a sectional view taken along line IV-IV of FIG. 4.
Figure 7:
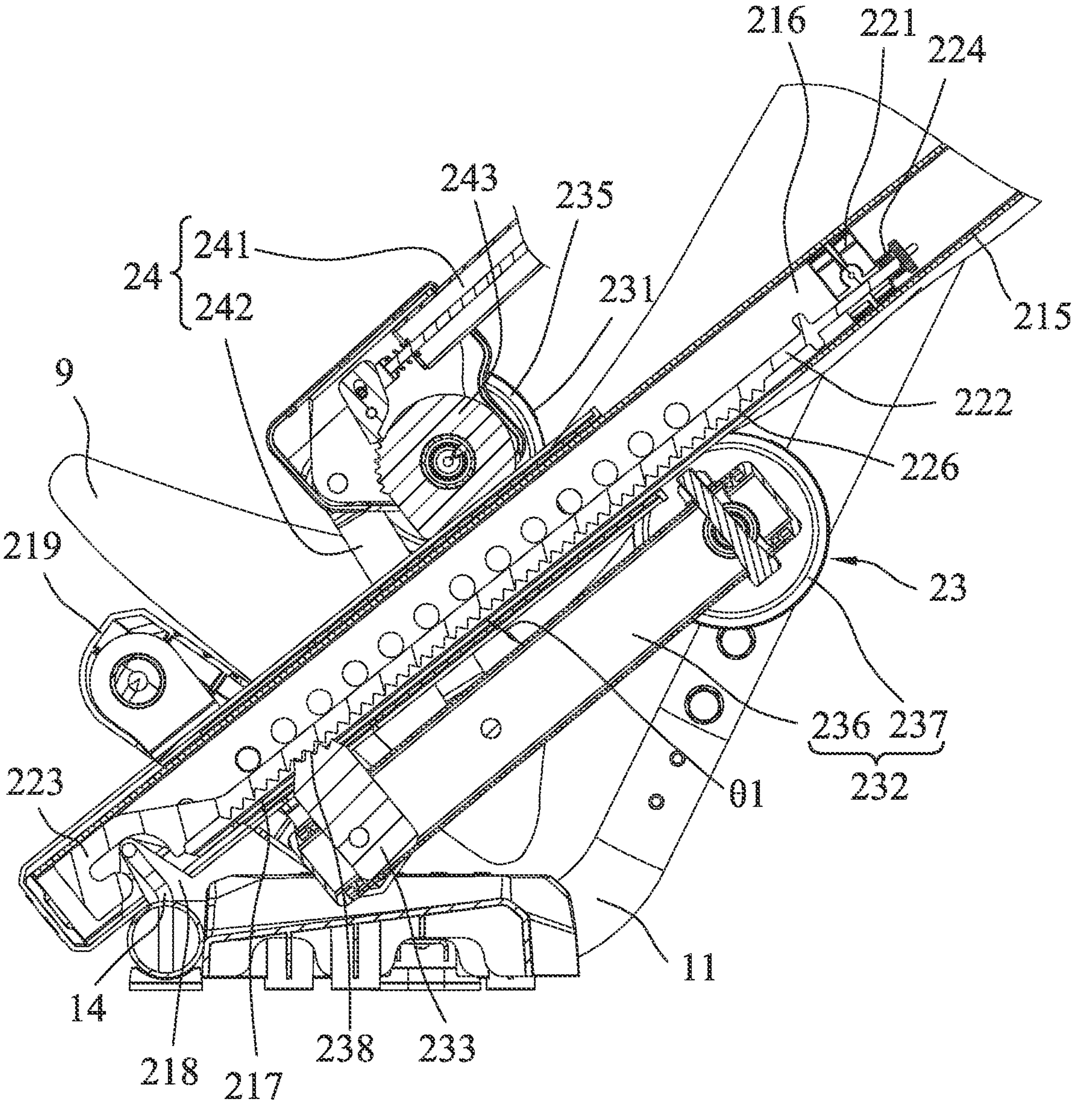
FIG. 7 is a sectional view similar to FIG. 6, illustrating when the tilt inversion mechanism is in a reversible state.

With reference to FIGS. 5 to 7, the tilt inversion mechanism 2 is operable relative to the supporting stand 1 between a non-reversible state (as shown in FIG. 6) and a reversible state (as shown in FIG. 7). In the non-reversible state, the toothed plate 233 of the rear feet holding assembly 232 is disengaged from the toothed portion 226 of the movable member 222 of the locking unit 22, and the second interlocking member 223 of the locking unit 22 is engaged with the first interlocking member 14 so as to restrict rotation of the tilt inversion mechanism 2 relative to the supporting stand 1. In the rotatable state, the toothed edge 238 of the toothed plate 233 is in meshing engagement with the toothed portion 226 of the movable member 222, and the second interlocking member 223 is brought to be removed from the first interlocking member 14 to permit the rotation of the tilt inversion mechanism 2 relative to the supporting stand 1.

Specifically, the inversion table is in the non-reversible state before used. In this state, the rear feet holding assembly 232 is in a locking position, where the toothed plate 233 is remote from the toothed portion 226 and the second interlocking member 223 is engaged with the first interlocking member 14. During usage of the inversion table, the user 9 moves the feet onto the foot retaining plate 219 from the foot plate 15, and rests the back on the backrest plate 214. At this stage, the ankles of the user 9 abut against the front ankle abutting members 235.

Figure 8:
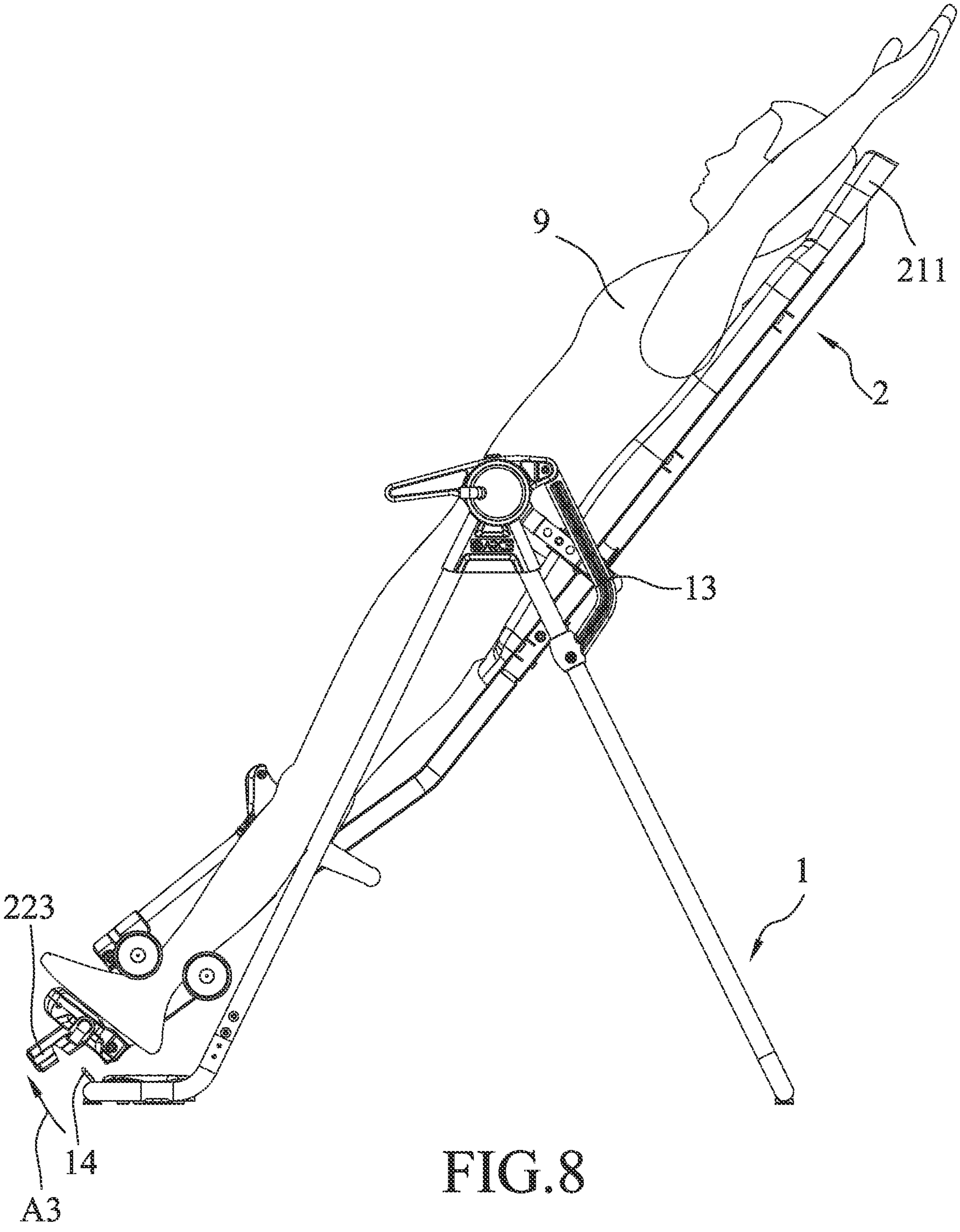
FIG. 8 is a schematic side view similar to FIG. 5, illustrating when the tilt inversion mechanism is in the reversible state and is rotated.
Figure 9:
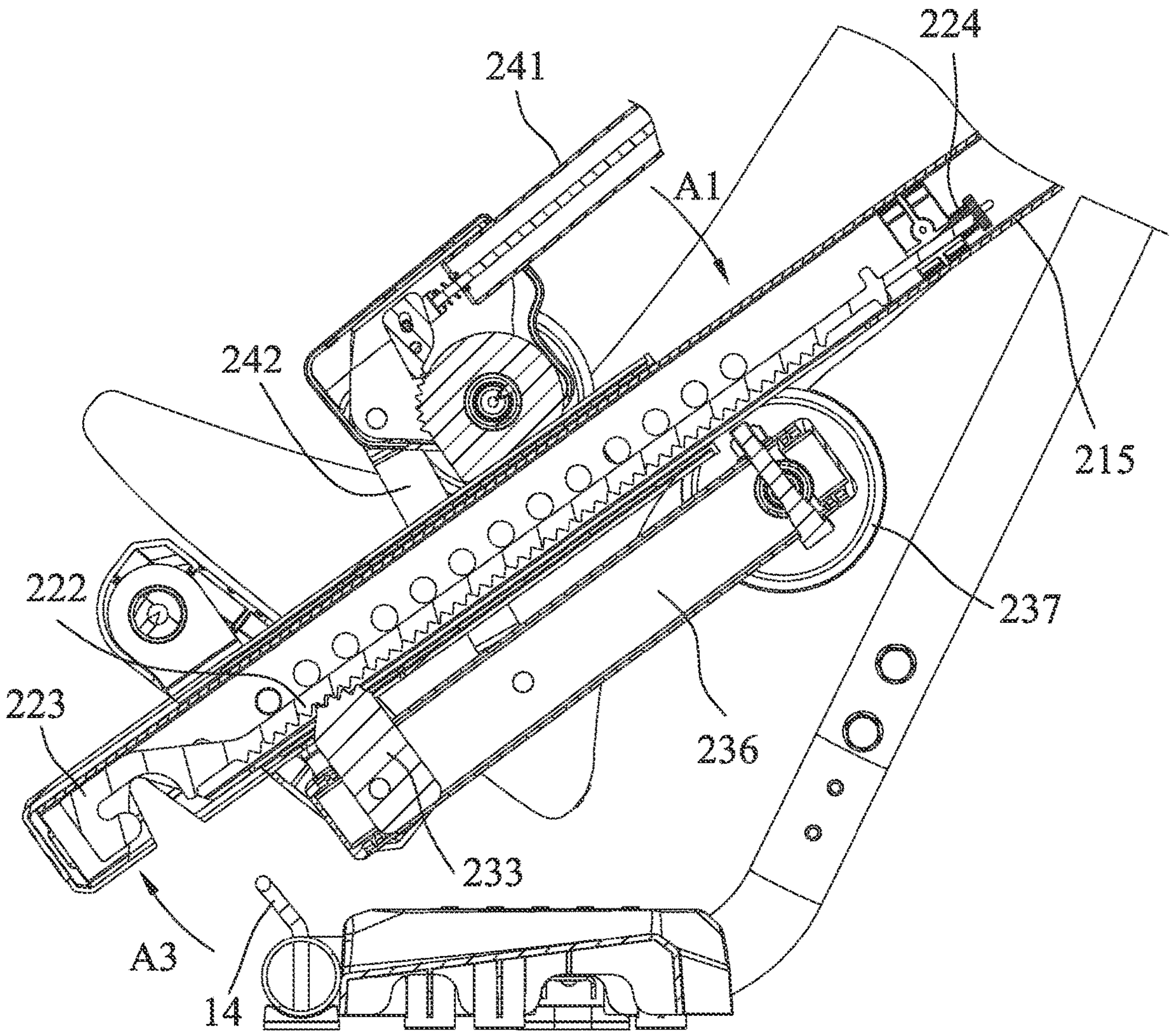
FIG. 9 is a sectional view similar to FIG. 6, illustrating when the tilt inversion mechanism is in the reversible state and is rotated.

Subsequently, the user 9 operates and turns the operating lever 241 in a first direction (A1) toward the feet to pull the transmitting members 242 upwardly such that the rear shaft 236 is pivoted in a second direction (A2) to an unlocking position, where the rear ankle abutting members 237 are moved toward the extension tube 215 to abut against the ankles of the user 9 so as to cooperate with the front ankle abutting members 235 for gripping the feet of the user 9, the included angle (θ1) between the rear shaft 236 and the toothed portion 226 is reduced, and the toothed edge 238 of the toothed plate 233 is moved to be engaged with the toothed portion 226. Then, a downward movement of the movable member 222 is driven away from the support table assembly 221 to disengage the second interlocking member 223 from the first interlocking member 14 so as to bring the tilt inversion mechanism 2 into the rotatable state. With reference to FIGS. 7 to 9, at this stage, the user 9 can grip the hand grips 13 to rotate the tilt inversion mechanism 2 in a third direction (A3) for performing an inversion exercise.

In this embodiment, the operating lever 241 is engaged with the pivot joint 243 in the form of a toothed wheel so as to be retained at a selected one of angular positions. Since the operable engagement of the operating lever 241 may be varied and is not limited to the aforesaid, and is not the main aspect of this disclosure, a detailed description thereof is omitted herein.

After the user performs the inversion exercise, the operating lever 241 is turned away from the extension tube 215 so as to disengage the toothed plate 233 from the movable member 222 such that the movable member 222 is moved upwardly by means of the spring 224 to engage the second interlocking member 223 with the first interlocking member 14 for returning the tilt inversion mechanism 2 back to the non-reversible state, as shown in FIG. 6.

As illustrated, with the removable engagement of the second interlocking member 223 of the locking unit 22 with the first interlocking member 14 of the supporting stand 1, and the operable meshing of the toothed plate 233 with the toothed portion 226, the tilt inversion mechanism 2 is kept in the non-reversible state when the feet holding unit 23 does not grip the feet of the user 9 so as to prevent undesired rotation of the tilt inversion mechanism 2 relative to the supporting stand 1. When the feet holding unit 23 grips the feet of the user 9, the tilt inversion mechanism 2 is allowed to be rotatable. Thus, for the user 9, the risk of performing an inversion exercise in a dangerous state is prevented so as to effectively improve the safety of using the inversion table. Moreover, the locking unit 22 is actuated along with the gripping of the feet by the feet holding unit 23 without operation by the user. The inversion table is hence simple and convenient to be used in an intuitive sense.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An inversion table comprising:

a supporting stand has a first interlocking member disposed on a lower portion thereof; and a tilt inversion mechanism including an inversion unit, a feet holding unit and a locking unit, said inversion unit being pivotally or reversely supported on said supporting stand, said feet holding unit being disposed on a lower portion of said inversion unit, said locking unit having a second interlocking member which is disposed on said lower portion of said inversion unit and removably engaged with said first interlocking member;

said tilt inversion mechanism being operable relative to said supporting stand between a non-reversible state and a reversible state, said feet holding unit being disengaged from said locking unit in the non-reversible state, said feet holding unit being engaged with said locking unit in the reversible state;

wherein said inversion unit includes a support table assembly and an extension assembly, said support table assembly being pivotally or reversely coupled with an upper portion of said supporting stand, said extension assembly being coupled with and extending from said support table assembly downwardly in a lengthwise direction, said locking unit including a mounting seat, an elongated movable member and a spring, said mounting seat being securely connected with said extension assembly, said movable member having a toothed portion which extends in the lengthwise direction and is movable relative to said mounting seat, said spring abutting against said mounting seat and said movable member to force said movable member toward said support table assembly.

2. The inversion table as claimed in claim 1, said feet holding unit includes a front feet holding assembly, a rear feet holding assembly, and a toothed plate fixedly arranged in said rear feet holding assembly, said rear feet holding assembly being pivotably connected to said extension assembly and extending to intersect said toothed portion by an included angle, wherein, when said tilt inversion mechanism is in the reversible state, said toothed plate is engaged with said toothed portion to drive a downward movement of said movable member with said second interlocking member to disengage said second interlocking member from said first interlocking member.

3. The inversion table as claimed in claim 2, wherein said extension assembly includes an extension tube and a foot retaining plate, said extension tube being securely disposed on a lower side of said support table assembly, said extension tube defining therein a mounting passage that extends in the lengthwise direction for receiving said locking unit therein, a slot that extends radially through said extension tube in the lengthwise direction to permit said toothed plate to extend into said mounting passage through said slot, and a through hole that extends radially through said extension tube, said first interlocking member being insertable into said mounting passage through said through hole to be engaged with said second interlocking member.

4. The inversion table as claimed in claim 3, wherein said rear feet holding assembly includes a rear shaft which has a lower end pivotably connected to said foot retaining plate, said toothed plate being securely disposed on said rear shaft and adjacent to said lower end and having a toothed edge which faces and is engageable with said toothed portion, said rear feet holding assembly further including two rear ankle abutting members which are connected with an upper end of said rear shaft.

5. The inversion table as claimed in claim 2, wherein said tilt inversion mechanism further includes an operating unit having an operating lever which is pivotally connected with said extension assembly, and at least one transmitting member which is linked between said operating lever and said rear feet holding assembly so as to transmit a linkage of said operating lever to pivot said rear feet holding assembly.

6. The inversion table as claimed in claim 2, wherein said front feet holding assembly is securely disposed on said extension assembly.

7. The inversion table as claimed in claim 6, wherein said front feet holding assembly includes two front ankle abutting members disposed on a front side of said extension assembly.

* * * * *